United States Patent [19]

Heidenreich et al.

[11] Patent Number: 4,779,287
[45] Date of Patent: Oct. 18, 1988

[54] TILTABLE METALLURGICAL FURNACE VESSEL

[75] Inventors: Peter Heidenreich, Müheim; Karl-Heinz Heinen, Siegen; Wolfgang Müller, Siegen; Heinz Veuhoff, Siegen, all of Fed. Rep. of Germany

[73] Assignee: Fried. Krupp GmbH, Essen, Fed. Rep. of Germany

[21] Appl. No.: 930,112

[22] Filed: Nov. 10, 1986

Related U.S. Application Data

[62] Division of Ser. No. 717,161, Mar. 27, 1985.

[51] Int. Cl.⁴ .................................. F27D 3/14
[52] U.S. Cl. ........................ 373/84; 222/598; 251/300; 373/83; 414/216
[58] Field of Search ............... 222/596–598, 222/600; 251/300; 373/33, 79, 83, 84, 115, 142, 143; 414/216

[56] References Cited

U.S. PATENT DOCUMENTS

| 966,310 | 8/1910 | Clark | 222/598 |
| 3,430,644 | 3/1969 | Lyman | 222/600 |
| 3,511,471 | 5/1970 | Rossi | 222/598 |
| 3,685,706 | 8/1972 | Fehling | 222/598 |
| 4,314,659 | 2/1982 | Shapland | 222/598 |
| 4,385,715 | 5/1983 | Meier et al. | 222/598 |
| 4,500,018 | 2/1985 | Zaugg et al. | 222/598 |
| 4,618,126 | 10/1986 | Tinnes et al. | 222/598 |

FOREIGN PATENT DOCUMENTS 2122315 1/1984 United Kingdom ............... 251/326

Primary Examiner—A. D. Pellinen
Assistant Examiner—Gregory D. Thompson
Attorney, Agent, or Firm—Spencer & Frank

[57] ABSTRACT

In a tiltable metallurgical furnace vessel having a completely closed lateral protrusion with a closable discharge opening on its underside, simplified furnace structure is achieved by configuring the protrusion as a removable, heatable fore-hearth that is constructed in the form of a casting spout. A particularly simple structure results due to the fact that the fore-hearth is flanged to the main furnace vessel and essentially has a box shape. The invention is particularly useful for electric arc furnaces.

17 Claims, 3 Drawing Sheets

TILTABLE METALLURGICAL FURNACE VESSEL

This is a division of application Ser. No. 717,161, filed Mar. 27, 1985.

BACKGROUND OF THE INVENTION

The present invention relates to a tiltable metallurgical furnace vessel, particularly a furnace vessel for an electric arc furnace, having a completely closed lateral protrusion that has an underside with a closable discharge opening.

The furnace vessel of an electric arc furnace as mentioned above is known from *Stahl und Eisen* [Steel and Iron] 104 (1984) No. 1, pages 7–10. Compared to an electric arc furnace vessel having a lateral pouring spout, the above-mentioned furnace vessels have the advantage that they have a larger furnace volume and that the necessary tilt angle is reduced. However, they have the drawback that the center of gravity of the vessel lies substantially outside the tilt axis and thus additional tilting forces are required. Furthermore the vessel, due to the eccentric position of its center of gravity, must be statically adapted by the provision of special reinforcements.

SUMMARY OF THE INVENTION

It is an object of the present invention to provide a tiltable metallurgical furnace vessel of the above-mentioned type which has an essentially circular cross section and nevertheless is discharged downwardly, but not through the bottom of the vessel and without substantial additional forces being required to tilt the vessel.

According to the present invention this object can be attained by providing a lateral protrusion that is removable from the furnace vessel, the protrusion being configured as a heatable fore-hearth which is constricted in the form of a pouring spout. The phrase "constricted in the form of a pouring spout" means that the side walls of the fore-hearth form a linear extension away from the opening in the side of the furnace vessel where the fore-hearth is connected. The term "fore-hearth" means an auxiliary chamber that is so positioned that its bottom is flush with the bottom of the furnace vessel. The present invention results in the advantage that no special furnace construction is required, i.e., that the hearths can be manufactured or retrofitted to have a circular horizontal cross section and all associated devices can be used unmodified. Moreover, heating the fore-hearth reliably prevents "freezing," i.e. lowering of the temperature, of the melt to below the liquid point.

If an insertable burner is used to heat the fore-hearth, this burner can simultaneously be used to melt scrap or the like.

A particularly simple and advantageous configuration is realized by flanging the fore-hearth to the furnace vessel.

Simple and secure sealng of the discharge opening of the fore-hearth is realized by a laterally pivotal cover which cooperates with a slide guide arranged as an oblique plane with respect to the discharge opening, so that the slide guide acts as a cam to vary the vertical position of the cover as it is pivoted.

DESCRIPTION OF THE PREFERRED EMBODIMENT

Figure 1:
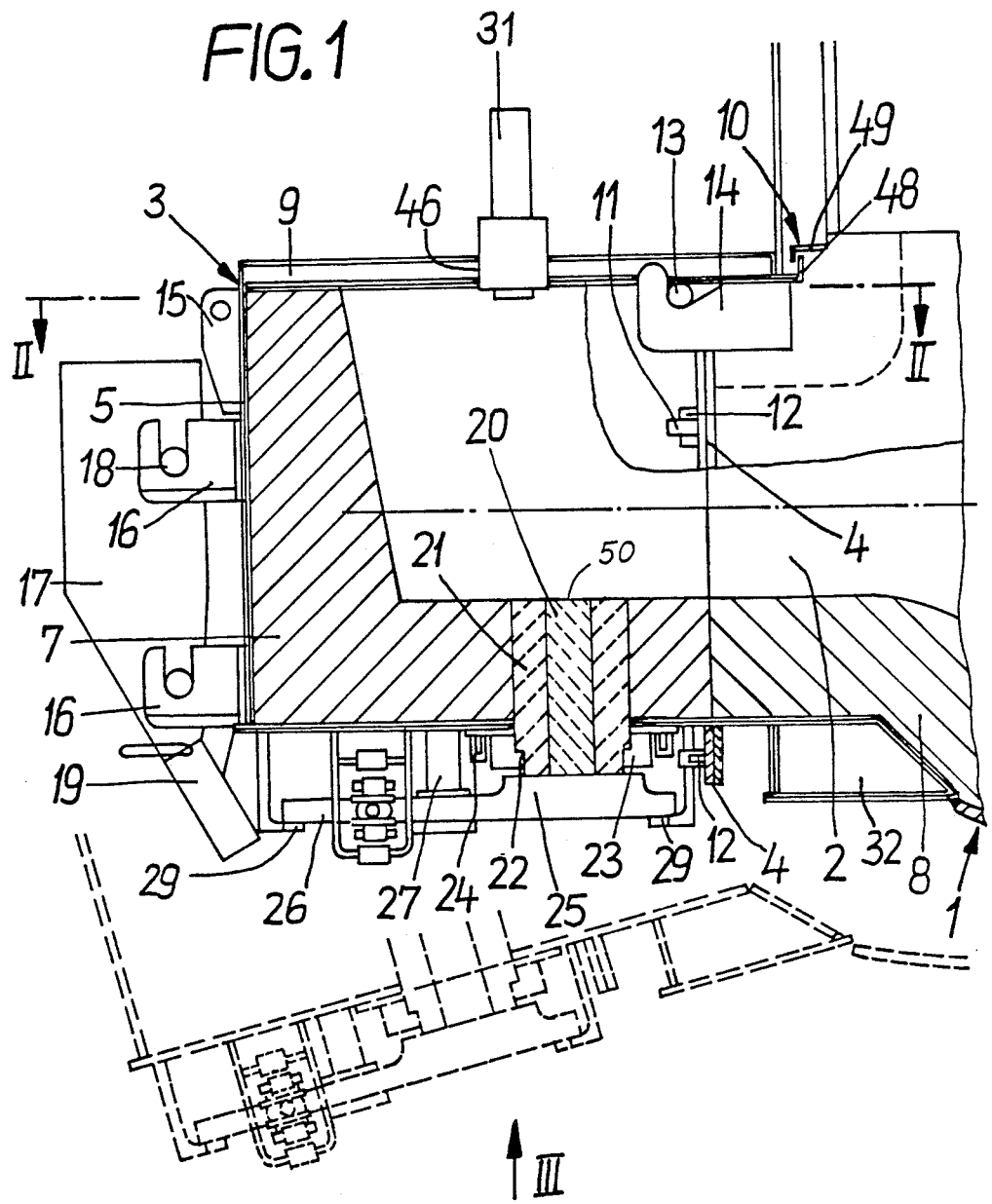
FIG. 1 is a vertical center sectional view of a portion of the metallurgical furnace vessel of the present invention, and illustrates a fore-hearth and part of the associated main furnace vessel to which the fore-hearth is attached.

As can be seen from FIGS. 1 and 2, the main furnace vessel 1 of an electric arc furnace has a side opening 2 having a rectangular cross section to which is connected a fore-hearth 3 by means of a flange connection 4, which will be described in more detail later. Fore-hearth 3 has an approximately block-shaped or box-shaped steel housing 5 which is provided with reinforcing ribs 40 (FIG. 2) on its exterior and with a lining 7 of refractory material in its interior, with lining 7 being flush with refractory lining 8 of furnace vessel 1. The open upper side of fore-hearth 3 is provided with a water-cooled cover 9 which, on the side of the furnace, can be pivoted and removed by way of a hook-in connection 10. The hook-in connection 10 for the cover 9 is constructed as a so-called cup seal which contains graphite as the sealing agent.

Flange connection 4 extends between furnace vessel 1 and fore-hearth 3 along the side walls and the underside of fore-hearth 3. Referring to FIG. 3, the flange 42 of furnace vessel 1 is provided with outwardly projecting bolts 11 having wedge-shaped recesses (not illustrated) therein. Bolts 11 extend through corresponding openings (not illustrated) in flange 43 of housing 5. To join housing 5 to vessel 1, tightening wedges 12 are pushed through the recesses in bolts 11 to press the flange 43 of fore-hearth 3 against the flange 42 on the furnace side. To facilitate attachment and removal of fore-hearth 3, the latter is provided, at each of its two upper corners facing furnace vessel 1, with a laterally projecting bolt 13 (see FIG. 2) which can be mounted in an associated upwardly open hook 14 affixed to furnace vessel 1 so as to be pivotal about the axis of the two bolts 13. Eyes 15 disposed in the upper region of fore-hearth 3 serve to accommodate hooks (not illustrated) used during attachment and removal of fore-hearth 3. When removed, fore-hearth 3 can easily be cleaned or replaced by a new or repaired fore-hearth if it is worn. Because of its block shape, manufacture of the fore-hearth is extremely inexpensive. Later retrofitting of an existing furnace vessel is easily possible by simply adapting the area of the casting spout.

At the exterior of fore-hearth 3, where it faces away from furnace vessel 1, a feed funnel 17 is attached by way of bolts 18 which engage in four tongue-like bearings 16 provided there, bolts 18 being affixed to funnel 17 and bearings 16 being affixed to fore-hearth 3. At its underside, feed funnel 17 is provided with an extension pipe 19 oriented in the direction of furnace vessel 1 for supplying alloying additives into a pan (not shown) which serves to mix the additives with the metal flowing out of discharge opening 20 disposed at the underside of fore-hearth 3.

Discharge opening 20 is provided with a tubular insert 21 made of a ceramic material and provided, at its outwardly projecting underise, with a drawn-in collar 22 which is engaged by a corresponding water-cooled flange-like mount 23. Flange-like mount 23 is connected to the underside of fore-hearth 3 by means of a wedge-bolt connection, with bolts 24 exending from housing 5 through openings (not illustrated) in mount 23 and with wedges 44 being inserted through openings (not illustrated) in bolts 24 as is illustrated best in FIG. 3. To secure the discharge opening 20, which is closed by a plug 50 of a suitable, known material, a cover 25 is pressed against the discharge side. Cover 25 is provided with a short arm 45 and with a horizontally extending lever 26 which is pivotally mounted to a pin 27 mounted on the underside of fore-hearth 3. The axis of pin 27 extends in the vertical direction. The pivoting movement of the cover 25 is effected by a double-action (that is, both extension and retraction are powered) hydraulic cylinder 28, which is mounted on the underside of fore-hearth 3 so as to be movable and which engages lever 26. Two arcuate slide guides 29, in the form of oblique planes fastened to the underside of forehearth 3, act as cams to guide lever 26 and arm 45 so that cover 25, when closed, is pressed against discharge opening 20. Furthermore, during the opening operation to permit discharge, cover 25 is simultaneously removed downwardly, i.e., as cover 25 rotates away from opening 20 it additionally undergoes a withdrawing movement. This configuration of the discharge opening seal has the advantage, in addition to forming a secure seal by firm pressure, that possible interference with the opening movement due to baked-on material and crusting can be prevented.

An induction coil 30 is disposed at the two facing parallel side walls of fore-hearth 3 so as to maintain the necessary discharge temperature of the molten metal and simultaneously blend it. A central opening 46 in water-cooled cover 9, covering fore-hearth 3, serves for the passage of an oil-oxygen burner 31, which is provided primarily to melt pieces of scrap. However, it may also be used to heat the melt in case coils 30 are malfunctioning. After removal of burner 31, the opening 46 in cover 9 is closed by means of a likewise water-cooled seal (not illustrated).

The maximum lowering movement of fore-hearth 3 together with main furnace vessel 1 is shown in FIG. 1 by the corresponding outline in dotted lines. However, for discharge, the furnace is tilted only to the extent that a small residue containing the slag remains in the furnace. The slag can then be discharged separately afterwards. Once the furnace is completely empty, the open discharge opening 20 is cleaned in a known manner by means of an oxygen lance. Then a new plug 50 is introduced into ceramic insert 21 and the latter is thereafter sealed by means of cover 25. Furnace vessel 1 is then available to receive a new charge.

Fore-hearth 3 and the liquid metal it contains do not substantially increase the force required to tilt the furnace due to their small mass. Moreover, opening 2 of furnace vessel 1 is provided with a water-cooled, collar-type frame 32 which surrounds it. This frame 32 as well as cover 9 and flange-like mount 23 are connected jointly to a cooling system (not illustrated) which simultaneously serves to cool the side walls of the furnace vessel.

Figure 2:
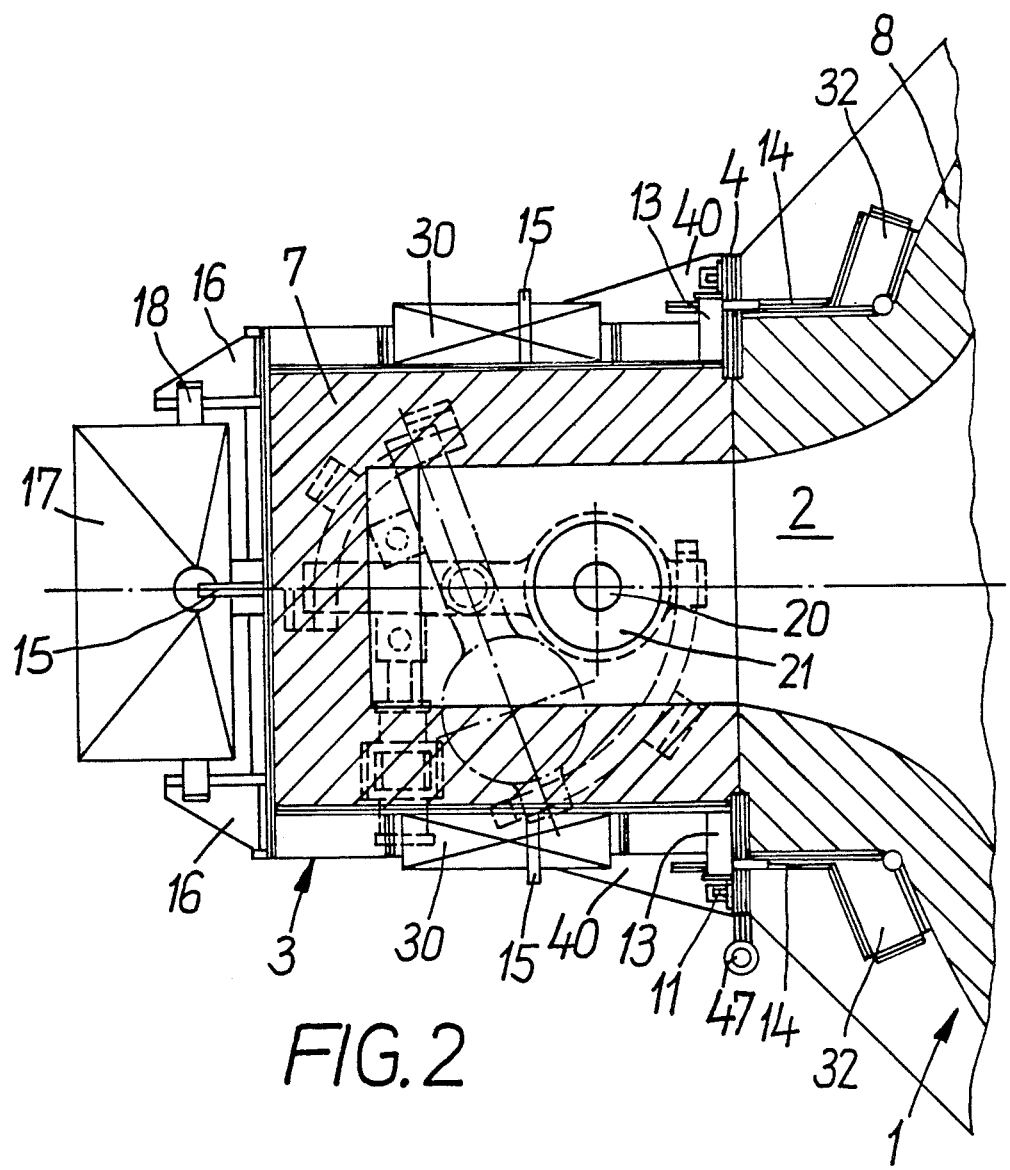
FIG. 2 is a sectional view along line II—II of FIG. 1.
Figure 3:
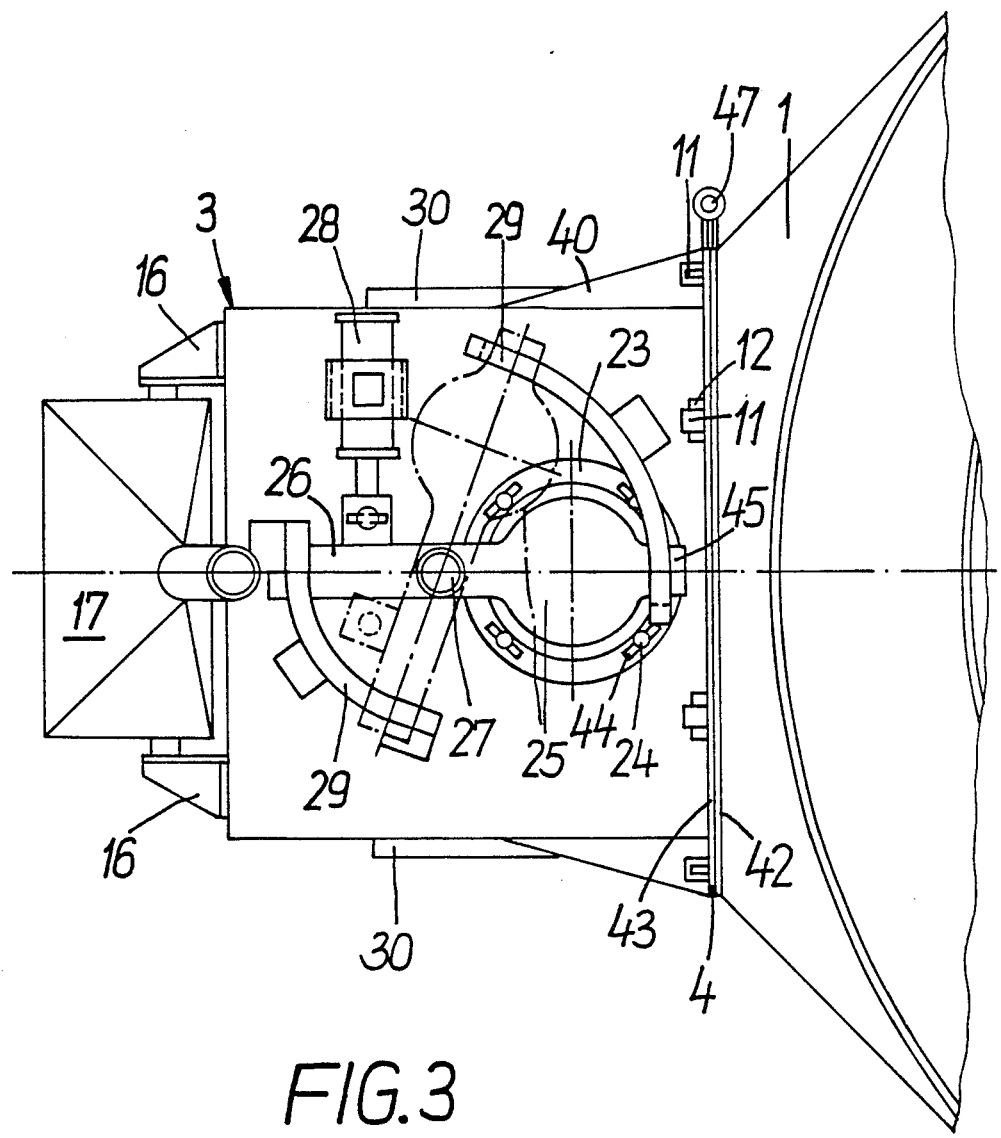
FIG. 3 is a view in the direction of arrow III of FIG. 1.

As shown in FIGS. 2 and 3, the flanges 42 and 43 of the flange connection 4 are each connected to hinge joints 47 which are so positioned that the fore-hearth 3, after removing the tightening wedges 12, can be pivoted about a perpendicular axis formed by said hinge joints. To obtain a close contact of the flanges 42 and 43 the hinge joints 47 are provided with a sufficient clearance.

The hook-in connection 10 is formed by an upwardly projecting fence 48 positioned at the end of the cover 9 adjacent to the furnace vessel 1, which cover 9 is surrounded by the downwardly projecting leg of an angle steel 49 affixed to furnace vessel 1.

It will be understood that the above description of the present invention is susceptible to various modifications, changes and adaptations, and the same are intended to be comprehended within the meaning and range of equivalents of the appended claims.

What we claim is:

1. A vessel for molten metal, comprising:
   a vessel bottom having means defining an outlet opening for downwardly discharging molten metal;
   an elongated closure element adapted to close said outlet opening, said closure element having first and second ends; and
   means mounting said closure element on said vessel bottom for lateral movement along a path that is generally parallel to said vessel bottom, said closure element being movable between a closed position wherein said closure element is aligned with said outlet opening and an open position wherein said closure element is not aligned with said outlet opening;
   wherein said means mounting said closure element includes a pin extending downward from said vessel bottom at a position spaced apart from said outlet opening, said closure element being rotatably mounted on said pin, said pin being located between said first and second ends, and slide means, extending from said vessel bottom and adjacent said first and second ends of said closure element, for slidably engaging said closure element.

2. A vessel as defined in claim 1, wherein said means defining said outlet opening comprises a plugable tubular insert which extends through said vessel bottom and which has a flat annular mouth, and wherein said closure element has a flat region which is aligned with said mouth when said closure element is in its closed position, the area of said flat region being substantially greater than the area enclosed by said mouth.

3. A vessel as defined in claim 1, further comprising a hydraulic cylinder mounted on said vessel bottom to rotate said closure element between its open and closed positions.

4. A vessel as defined in claim 1, wherein said slide means further comprises cam means for varying the vertical distance between said closure element and said outlet opening as said closure element is rotated.

5. A vessel as defined in claim 1, wherein said closure element has a generally disk-shaped portion which is aligned with said outlet opening when said closure element is in its closed position, an elongated lever portion extending from said disk-shaped portion to said first end of said closure element, said lever portion being connected to said pin, and a further lever portion extending from said disk-shaped portion to said second end of said closure element, said further lever portion being shorter than said lever portion.

6. A vessel as defined in claim 5, wherein said slide means comprises a first arcuate slide guide extending from said vessel bottom, and a second arcuate slide guide extending from said vessel bottom.

7. A vessel as defined in claim 6, wherein said first slide guide has an end and said second slide guide has an end, said ends of said slide guides being spaced apart by a gap, and further comprising a hydraulic cylinder mounted on said vessel bottom to rotate said closure element in one direction to the open position and to rotate said closure element in the opposite direction to the closed position, the hydraulic cylinder being connected to the closure element via the gap between the ends of the slide guides.

8. A vessel as defined in claim 5, wherein said closure element has a bottom side and a top side, said top side of said closure element facing said vessel bottom, and wherein said slide means slidably engages said bottom side of said closure element.

9. A vessel as defined in claim 5, wherein said means defining said outlet opening comprises a tubular insert which extends through said vessel bottom and which has an annular mouth located below said vessel bottom, and wherein said generally disk-shaped portion of said cover element is positioned to close said mouth when said cover element is in said closed position and is separated from said vessel bottom by a gap when said cover element is in said open position.

10. A vessel as defined in claim 1, wherein said vessel comprises an electric furnace.

11. A vessel as defined in claim 2, further comprising a plug in said tubular insert.

12. A vessel as defined in claim 2, wherein said tubular insert has a collar portion spaced apart from said mouth, and further comprising a fluid-cooled flange mount, said mount being releasably connected to said vessel bottom adjacent said tubular insert, said mount engaging said collar portion.

13. A vessel for molten metal, comprising:
a vessel bottom having an aperture;
a tubular insert which extends through said aperture in said vessel bottom and which has a flat annular mouth that is positioned below said vessel bottom;
a displaceable plug in said tubular insert;
a pin extending downward from said vessel bottom at a position spaced apart from said mouth;
an elongated closure element having first and second ends and having top and bottom sides, said closure element being rotatably mounted on said pin, said top side of said closure element facing said vessel bottom and being spaced apart from said vessel bottom;
slide means, extending from said vessel bottom, for slidably engaging the bottom side of said closure element; and
double-acting hydraulic cylinder means, mounted on said vessel bottom and connected to said closure element, for selectively rotating said closure element in one direction to a closed position wherein said cover element covers said mouth and for selectively rotating said cover element in the opposite direction to an open position wherein said cover element is displaced from said mouth and spaced apart from said vessel bottom by a gap.

14. A vessel as defined in claim 13, wherein said slide means further comprises cam means for varying the vertical distance between said closure element and said vessel bottom as said closure element is rotated.

15. A vessel as defined in claim 13, wherein said slide means comprises a first arcuate slide guide attached to said vessel bottom to slidably engage said bottom side of said closure element; and a second arcuate slide guide attached to said vessel bottom to slidably engage the bottom side of said closure element.

16. A vessel defined in claim 15, wherein said slide guides have portions which slidably engage said bottom side of said cover element and which are disposed obliquely so as to vary the distance between said closure element and said vessel bottom when said closure element is rotated.

17. A vessel as defined in claim 13, wherein said tubular insert has a collar portion spaced apart from said mouth, and further comprising a fluid-cooled flange mount, said mount being releasably connected to said vessel bottom adjacent said tubular insert, said mount engaging said collar portion.

* * * * *

UNITED STATES PATENT AND TRADEMARK OFFICE
CERTIFICATE OF CORRECTION

PATENT NO. : 4,779,287
DATED      : October 18, 1988
INVENTOR(S): HEIDENREICH et al It is certified that error appears in the above-identified patent and that said Letters Patent is hereby corrected as shown below:

Title page:

The following new section [30] should appear in the heading of the patent:

--[30]    Foreign Application Priority Data

March 31, 1984    [DE]   Fed. Rep. of Germany............34 12 077  --.

Signed and Sealed this

Eleventh Day of July, 1989

Attest:

DONALD J. QUIGG

Attesting Officer

Commissioner of Patents and Trademarks